(12) United States Patent
Shirasaka et al.

(10) Patent No.: US 11,355,981 B2
(45) Date of Patent: Jun. 7, 2022

(54) STATOR, MOTOR, AND COMPRESSOR HAVING AN INTEGRALLY MOLDED INSULATOR

(71) Applicant: DAIKIN INDUSTRIES, LTD., Osaka (JP)

(72) Inventors: Hiroki Shirasaka, Osaka (JP); Keiji Aota, Osaka (JP); Hideki Fujii, Osaka (JP); Shoujirou Naka, Osaka (JP); Yoshihiro Igarashi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 618 days.

(21) Appl. No.: 16/325,698

(22) PCT Filed: Jul. 13, 2017

(86) PCT No.: PCT/JP2017/025558
§ 371 (c)(1),
(2) Date: Feb. 14, 2019

(87) PCT Pub. No.: WO2018/047462
PCT Pub. Date: Mar. 15, 2018

(65) Prior Publication Data
US 2021/0336504 A1   Oct. 28, 2021

(30) Foreign Application Priority Data
Sep. 8, 2016 (JP) .............................. JP2016-175776

(51) Int. Cl.
*H02K 3/34* (2006.01)
*F04B 35/04* (2006.01)
(Continued)

(52) U.S. Cl.
CPC ............. *H02K 3/345* (2013.01); *F04B 35/04* (2013.01); *H02K 1/04* (2013.01); *H02K 1/16* (2013.01); *H02K 15/10* (2013.01); *H02K 3/34* (2013.01)

(58) Field of Classification Search
CPC H02K 1/04; H02K 1/16; H02K 3/345; H02K 15/10; F04B 35/04
(Continued)

(56) References Cited

U.S. PATENT DOCUMENTS

| 2004/0046477 A1 | 3/2004 | Kuroyanagi et al. |
| 2008/0122300 A1 | 5/2008 | Cho et al. |

(Continued)

FOREIGN PATENT DOCUMENTS

| JP | 2002-354737 A | 12/2002 |
| JP | 2003-324913 A | 11/2003 |

(Continued)

OTHER PUBLICATIONS

International Preliminary Report of corresponding PCT Application No. PCT/JP2017/025558 dated Mar. 21, 2019.
(Continued)

*Primary Examiner* — Rashad H Johnson
(74) *Attorney, Agent, or Firm* — Global IP Counselors, LLP

(57) ABSTRACT

A stator includes a stator core in which an annular back yoke is integrated with a plurality of teeth circumferentially arranged on the back yoke at intervals, and an insulator that sandwiches the stator core from axial sides of the stator core. The insulator is molded integrally with the stator core using resin molding such that the insulator covers an inner surface of a slot portion of the stator core. A motor includes a rotor and the stator radially facing the rotor. A compressor includes a hermetic container, a compression mechanism (Continued)

disposed in the hermetic container, the motor disposed in the hermetic container to drive the compression mechanism.

13 Claims, 13 Drawing Sheets

(51) Int. Cl.
*H02K 1/04* (2006.01)
*H02K 1/16* (2006.01)
*H02K 15/10* (2006.01)

(58) Field of Classification Search
USPC .................................. 310/214, 215, 216.001
See application file for complete search history.

(56) References Cited

U.S. PATENT DOCUMENTS

| | | |
|---|---|---|
| 2009/0102307 A1 | 4/2009 | Amano |
| 2009/0267442 A1 | 10/2009 | Yamawaki et al. |
| 2011/0285240 A1 | 11/2011 | Tsukamoto et al. |
| 2012/0080976 A1 | 4/2012 | Oka et al. |
| 2013/0169085 A1* | 7/2013 | Taema ..................... H02K 3/28 310/71 |
| 2015/0236574 A1* | 8/2015 | Ono ......................... F04C 18/34 310/216.113 |
| 2016/0211717 A1* | 7/2016 | Honda ................... H02K 1/148 |
| 2016/0211733 A1* | 7/2016 | Hattori ................... H02K 3/521 |
| 2017/0201135 A1* | 7/2017 | Kai ........................... H02K 3/18 |

FOREIGN PATENT DOCUMENTS

| | | |
|---|---|---|
| JP | 2006-180698 A | 7/2006 |
| JP | 3824001 B2 | 9/2006 |
| JP | 2014-187856 A | 10/2014 |
| WO | 03/028188 A1 | 4/2003 |
| WO | 2011/013273 A1 | 2/2011 |

OTHER PUBLICATIONS

European Search Report of corresponding EP Application No. 17 84 8407.7 dated Dec. 12, 2019.

International Search Report of corresponding PCT Application No. PCT/JP2017/025558 dated Oct. 10, 2017.

\* cited by examiner

STATOR, MOTOR, AND COMPRESSOR HAVING AN INTEGRALLY MOLDED INSULATOR

CROSS-REFERENCE TO RELATED APPLICATIONS

This U.S. National stage application claims priority under 35 U.S.C. § 119(a) to Japanese Patent Application No. 2016-175776, filed in Japan on Sep. 8, 2016, the entire contents of which are hereby incorporated herein by reference.

TECHNICAL FIELD

The present invention relates to stators, motors, and compressors.

BACKGROUND ART

A conventional stator includes a stator core and an insulator, the stator core including a plurality of teeth, the insulator being disposed on both axial ends of the stator core (see Japanese Patent No. 3824001, for example).

In the above-mentioned stator, a coil is wound around each of the teeth of the stator core, and a sheet-shaped insulating slot cell is disposed in each of slot portions between teeth and insulates the coil and the teeth from each other.

SUMMARY

Technical Problem

The stator configured as above is problematic in that a process of assembling the stator is complicated because of need for a step of placing a slot cell in each of slot portions between teeth before a coil is wound around each of the teeth of the stator core.

In addition, the process of assembling the above-mentioned stator involves higher cost because of need for operations including making sure that the slot cell is in a correct place in the slot portion and securing the slot cell.

Accordingly, an object of the present invention is to provide a stator that can be assembled by a simpler process.

Another object of the present invention is to provide a motor that includes the stator.

Still another object of the present invention is to provide a compressor that includes the motor.

In order to solve the above-described problems, a stator according to the present invention includes:

a stator core in which an annular back yoke is integrated with a plurality of teeth arranged on the back yoke at intervals along a circumferential direction of the back yoke, and an insulator that sandwiches the stator core from both axial sides of the stator core, wherein the insulator is molded integrally with the stator core through resin molding in such a way that the insulator covers an inner surface of a slot portion of the stator core.

The above-mentioned slot portion of the stator core refers to a region for winding a coil between adjacent teeth. The phrase "stator core in which . . . is integrated" refers to the stator core in which the back yoke and the plurality of teeth are in an integral and unseparated relationship. The phrase "the insulator molded integrally with the stator core through resin molding" means that the insulator and the stator core are in an inseparable relationship established by, for example, flowing a resin during molding of the insulator in such a way that the resin covers the inner surface of each of the slot portions of the stator core.

According to the above-mentioned configuration, the insulator is molded integrally with the stator core through resin molding and covers the inner surface of each of slot portions of the stator core. Hence, each of the teeth and the coil wound therearound can be insulated from each other by a resin. This eliminates need for slot cells, which in turn eliminates need for a process of placing the slot cells into the slot portions between teeth, and thus the assembly process can be simplified.

In a stator according to one aspect, the insulator includes a thick-walled portion and a thin-walled portion in a portion where the insulator covers the inner surface of the slot portion of the stator core.

According to the above-mentioned aspect, the inner surface of the slot portion of the stator core is covered by the thick-walled portion and the thin-walled portion of the insulator. Hence, it is ensured that the thick-walled portion provides a flow path for a resin when the insulator is molded integrally with the stator core through resin molding, and thus the thin-walled portion can be made thinner while the resin covering the inner surface of the slot portion is prevented from molding failure.

In a stator according to another aspect, the thick-walled portion in the insulator is disposed in a corner of the slot portion of the stator core.

Examples of the corner of the slot portion include a corner of the inner surface of the slot portion, located near the back yoke (at the base of a tooth), a corner of the inner surface of the slot portion, located near a flange for preventing detachment of the coil from the tooth, and a corner of the inner surface of the slot portion, located at an end of the flange for preventing detachment of the coil from the tooth (at either of the facing edges of adjacent flanges).

According to the above-mentioned aspect, the thick-walled portion of the insulator is disposed in a corner of the slot portion of the stator core, which makes it unlikely that coil to be wound around a tooth in a process after molding interferes with the thick-walled portion. In addition, by the thin-walled portion of the resin covering the inner surface of the slot portion except for the corner being made thinner, it becomes possible to insulate the coil from the teeth without reducing an effective winding area.

In a stator according to another aspect, the thick-walled portion of the insulator is a ridge part disposed in a portion of the insulator that covers a back yoke-side part of the inner surface of the slot portion of the stator core, and that is located in a middle between adjacent teeth of the stator core.

According to the above-mentioned aspect, the ridge part, which is a part of the insulator covering a part, on the side of the back yoke, of the inner surface of the slot portion of the stator core, is disposed as the thick-walled portion in the middle between adjacent teeth of the stator core. Hence, it is ensured that the ridge part disposed on the side of the back yoke provides a flow path for a resin when the insulator is molded integrally with the stator core through resin molding, and thus the thin-walled portion can be made thinner while the resin covering the inner surface of the slot portion is prevented from molding failure. Since the ridge part is disposed in the middle between adjacent teeth of the stator core, the coil to be wound around a tooth in a process after the molding does not interfere with the ridge part. In addition, except for the ridge part, the resin covering the inner surface of the slot portion is made thin-walled, and thus the coil can be insulated from the teeth without reducing the effective winding area.

In a stator according to another aspect, the thick-walled portion of the insulator is disposed on the slot portion of the stator core in such a way as to be continuous along an axial direction.

According to the above-mentioned aspect, by providing the ridge part in the insulator on the slot portion of the stator core in such a way as to be continuous along the axial direction, it is ensured that the ridge part provides a flow path for a resin all the way along the axial direction when the insulator is molded integrally with the stator core through resin molding, and thus the resin covering the inner surface of the slot portion can be prevented from molding failure.

In a stator according to another aspect, the insulator includes annual end parts and a coupling portion, the annual ends being disposed in such a way as to sandwich the stator core from both axial sides, the coupling portion being disposed axially extending along an outer periphery of the stator core in such a way as to couple the annual end parts with each other.

According to the above-mentioned aspect, the coupling portion is disposed on the outer periphery of the stator core along the axial direction in such a way as to couple the annular end parts that sandwich the stator core from both axial sides, which can improve strength of the outer periphery of the stator core and the insulator after integral molding.

In a stator according to another aspect, the insulator includes a first resin molded part covering the inner surface of the slot portion of the stator core and a second resin molded part continuous with the first resin molded part and covering both axial sides of the stator core.

According to the above-mentioned aspect, the insulator may be molded integrally with the stator core through two-stage molding in which the first resin molded part is molded in such a way as to cover the inner surface of the slot portion of the stator core, and then the second resin molded part is molded in such a way as to be continuous with the first resin molded part and to cover both axial sides of the stator core, Therefore, the first resin molded part that covers the inner surface of the slot portion can be easily made thin-walled by molding the first resin molded part with a suitable mold and resin material, apart from the molding process carried out for the second resin molded part that covers both axial sides of the stator core.

In a stator according to another aspect, a resin for the first resin molded part of the insulator has higher fluidity than a resin for the second resin molded part.

According to the above-mentioned aspect, the fluidity of the resin for the first resin molded part of the insulator is higher than that of the resin for the second resin molded part. Thus, during molding of the first resin molded part, which is carried out separately from the second resin molded part, the inner surface of the slot portion is covered with the resin having higher fluidity, thereby easily achieving a thin-walled resin while ensuring that molding failure is prevented.

A motor of the present invention includes:
a rotor; and
the stator according to any one of the foregoing embodiments, the stator being disposed radially facing the rotor.

The configuration described above achieves a motor that can be assembled by a simpler process.

A compressor according to the present invention includes:
a hermetic container;
a compression mechanism disposed in the hermetic container; and
the motor disposed in the hermetic container to drive the compression mechanism.

The configuration described above achieves a compressor including a motor that can be assembled by a simpler process.

As apparent from the foregoing, the present invention achieves providing a stator that can be assembled by a simpler process, a motor equipped with the stator, and a compressor equipped with the motor, by molding an insulator integrally with a stator core through resin molding and covering the inner surface of a slot portion of the stator core with the insulator.

DETAILED DESCRIPTION OF EMBODIMENT(S)

A stator, a motor, and a compressor of the present invention will be described in detail below by way of embodiments illustrated in the figures.

First Embodiment

Figure 1:
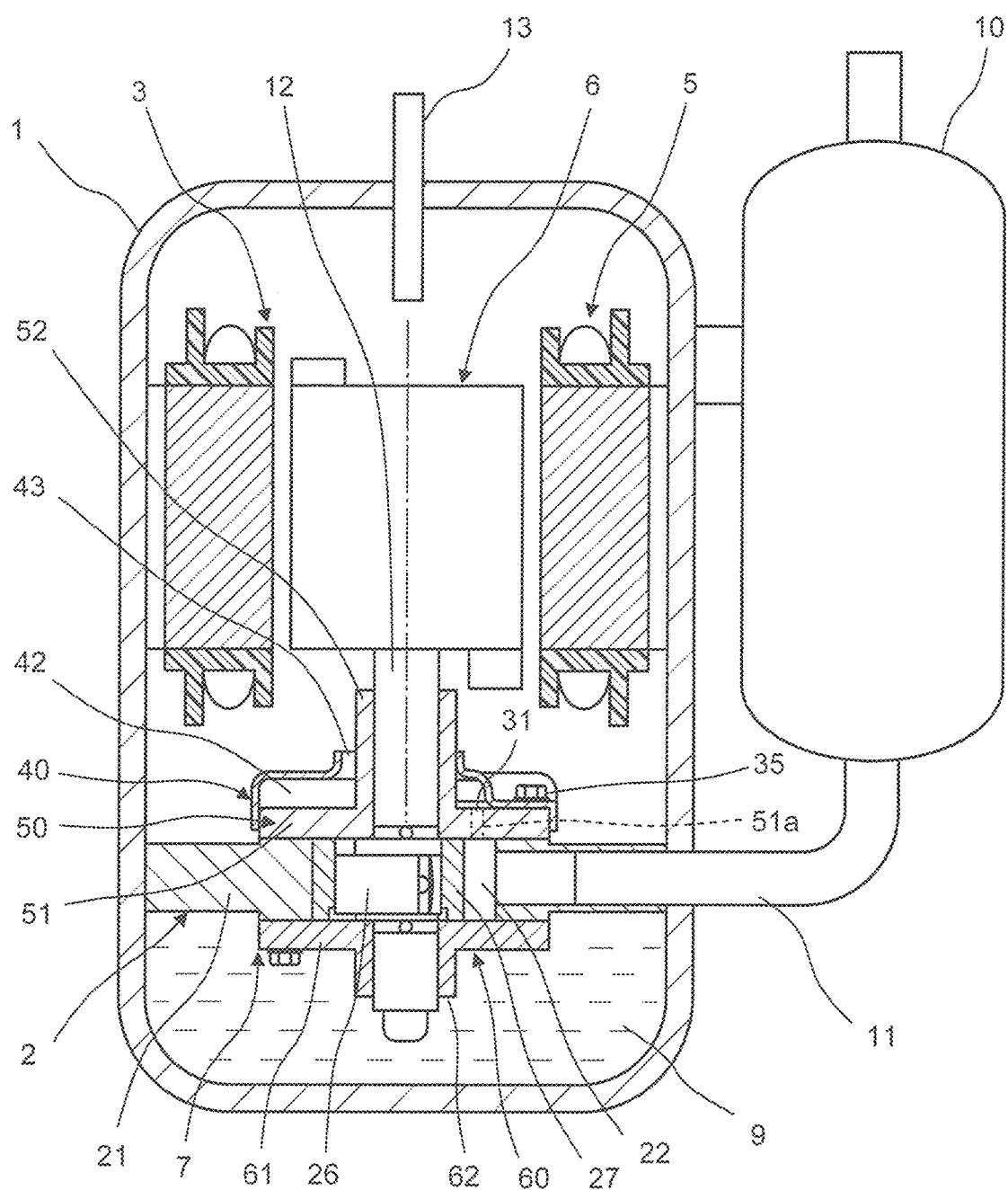
FIG. 1 is a longitudinal cross-sectional view of a compressor according to a first embodiment of the present invention.

FIG. 1 is a longitudinal cross-sectional view of a compressor according to a first embodiment of the present invention.

As illustrated in FIG. 1, the compressor of the first embodiment includes a hermetic container 1, a compression mechanism 2 disposed in the hermetic container 1, and a motor 3 disposed in the hermetic container 1 and configured to drive the compression mechanism 2 via a shaft 12.

The compressor is what is called a vertical and high-pressure dome type rotary compressor, and includes the compression mechanism 2 disposed in a lower portion of the hermetic container 1 and the motor 3 disposed above the compression mechanism 2. The compression mechanism 2 is to be driven by a rotor 6 of the motor 3 via the shaft 12.

The compression mechanism 2 suctions a refrigerant gas from an accumulator 10 through a suction pipe 11. The refrigerant gas is obtained by controlling the compressor as well as a condenser, an expansion mechanism, and an evaporator (not illustrated) that constitute an air conditioner as an example of a refrigeration system.

The compressor allows a compressed high-temperature and high-pressure refrigerant gas to be discharged from the compression mechanism 2, to fill the inside of the hermetic container 1, then to pass through a gap between the stator 5 and the rotor 6 of the motor 3, and, after the motor 3 is cooled, to be discharged through a discharge pipe 13 disposed on top of the motor 3. An oil sump 9 holding lubricating oil is formed in the bottom of a high-pressure region in the hermetic container 1.

The compression mechanism 2 includes a cylinder 21 attached on an inner surface of the hermetic container 1, and an upper end plate member 50 and a lower end plate member 60 attached over an upper opening end and over a lower opening end, respectively, of the cylinder 21. The cylinder 21, the upper end plate member 50, and the lower end plate member 60 form a cylinder chamber 22.

The upper end plate member 50 includes a disc-shaped main body 51 and a boss part 52 disposed upward around the center of the main body 51. The shaft 12 is inserted into the main body 51 and the boss part 52.

The main body 51 includes a discharge outlet 51a communicatively connected with the cylinder chamber 22. A discharge valve 31 that opens and closes the discharge outlet 51a is attached to the main body 51 in such a way as to be located on a side of the main body 51 opposite from the cylinder 21.

A cup-shaped muffler cover 40 is attached to the main body 51 on the opposite side from the cylinder 21 in such a way as to cover the discharge valve 31. The muffler cover 40, through which the boss part 52 is inserted, is fastened to the main body 51 with a bolt 35 or the like. The muffler cover 40 and the upper end plate member 50 form a muffler chamber 42. The muffler chamber 42 and the cylinder chamber 22 are communicatively connected with each other via the discharge outlet 51a. The muffler cover 40 also includes a hole part 43 through which the muffler chamber 42 is communicatively connected to the outside of the muffler cover 40.

The lower end plate member 60 includes a disc-shaped main body 61 and a boss part 62 disposed downward around the center of the main body 61. The shaft 12 is inserted into the main body 61 and the boss part 62.

In this way, one end of the shaft 12 is supported by both the upper end plate member 50 and the lower end plate member 60. The one end (i.e., a supported end side) of the shaft 12 is inserted into the cylinder chamber 22.

On the supported end side of the shaft 12, an eccentric pin 26 is disposed in the cylinder chamber 22 of the compression mechanism 2. The eccentric pin 26 is fitted to a roller 27. The roller 27 is revolvably disposed in the cylinder chamber 22, and then a compressing action is provided by revolving movement of the roller 27.

In other words, the one end of the shaft 12 is supported on both sides of the eccentric pin 26 by a housing 7 (that includes the upper end plate member 50 and the lower end plate member 60) of the compression mechanism 2.

Figure 2:
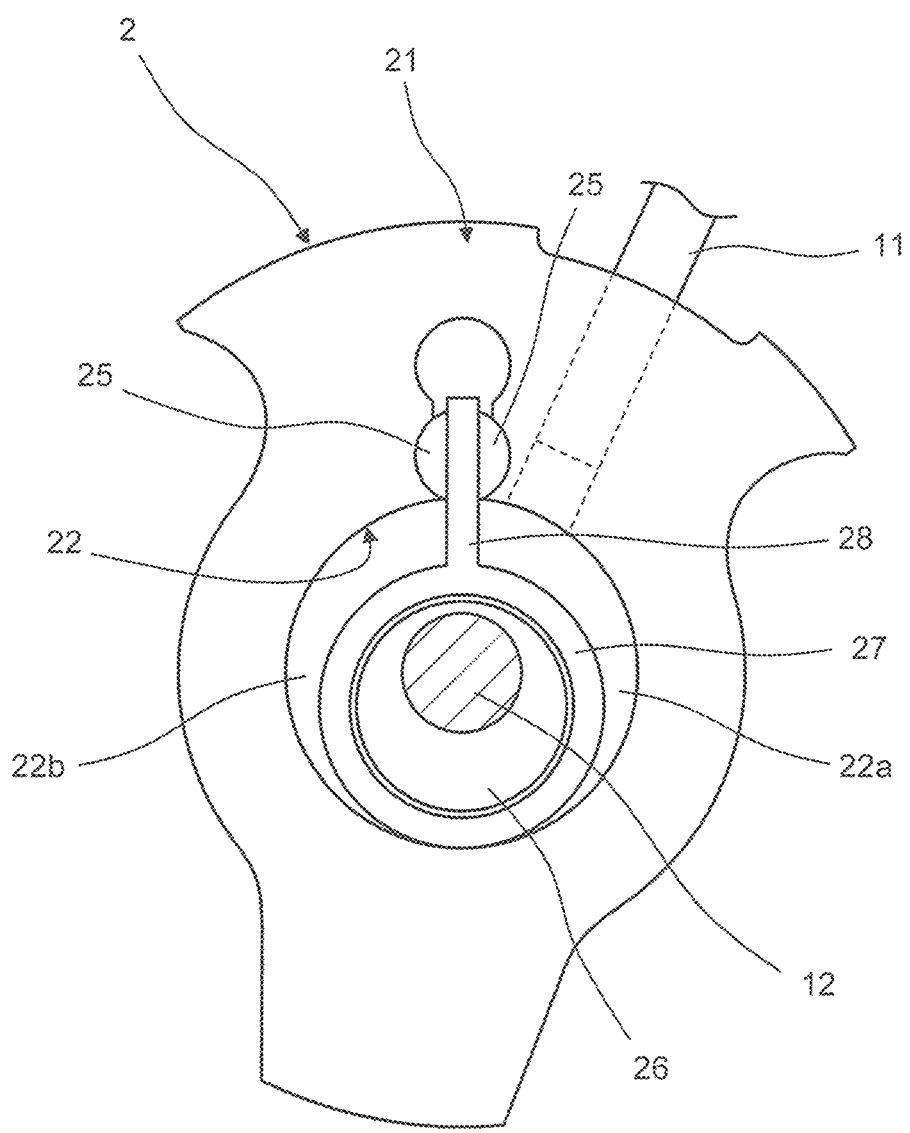
FIG. 2 is a plan view of a main part of a compression mechanism in the compressor.

Referring to FIG. 2, the following describes a compressing action provided by the cylinder 21 in the compression mechanism 2. FIG. 2 is a plan view of a main part of the compression mechanism 2 in the compressor.

As illustrated in FIG. 2, the cylinder chamber 22 is partitioned by a blade 28 provided integrally with the roller 27. When the eccentric pin 26 eccentrically turns along with the shaft 12, the roller 27 fitted to the eccentric pin 26 revolves with an outer periphery of the roller 27 being in contact with an inner periphery of the cylinder chamber 22. As the roller 27 revolves, a low-pressure refrigerant gas is suctioned through the suction pipe 11 into a suction chamber 22a and compressed in a discharge chamber 22b into a high-pressure refrigerant gas, which is then discharged from the discharge outlet 51a (illustrated in FIG. 1).

Figure 3:
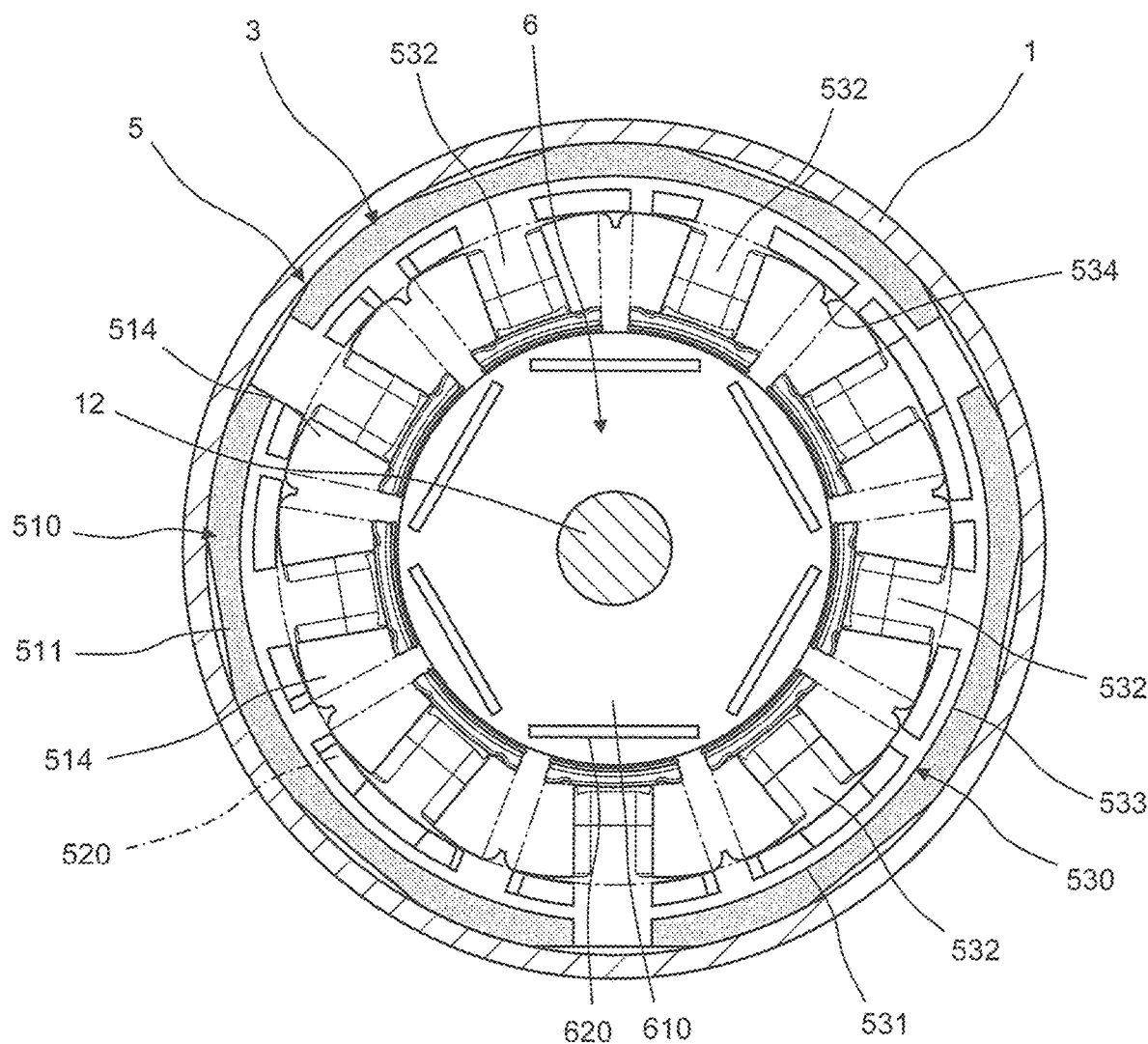
FIG. 3 is a transverse cross-sectional view of a main part including a motor in the compressor.

FIG. 3 is a transverse cross-sectional view of a main part including the motor 3, of the compressor. In FIG. 3, identical reference numbers are given to components identical to those in FIG. 1. The motor 3 is an inner rotor type motor.

As illustrated in FIG. 3, the motor 3, which is mounted inside the hermetic container 1, includes the rotor 6 and the stator 5 which is disposed radially outward from the rotor 6 across an air gap.

The rotor 6 includes a cylindrical rotor core 610 and six magnets 620 arranged at intervals and embedded in the rotor core 610 along a circumferential direction. The rotor core 610 is constituted of a plurality of stacked electromagnetic steel sheets. The shaft 12 is inserted into a hole part made at the center of the rotor core 610. The magnets 620 are plate-shaped permanent magnets.

The stator 5 is disposed in such a way as to radially face the rotor 6. The stator 5 includes a stator core 510, an insulator 530 attached to both axial end faces of the stator core 510, and a coil 520 wound around the stator core 510 along with the insulator 530.

As a material for the insulator 530, an insulating resin is used, such as liquid crystalline polymer (LCP), polybutylene terephthalate (PBT), or polyphenylene sulfide (PPS).

Note that the motor 3 employed in a compressor is exposed to refrigerants and refrigeration oils, and thus the material used for the insulator 530 of the stator 5 is resistant to such refrigerants and refrigeration oils in order not to degrade insulation performance and the like so much.

The stator core 510 is constituted of a plurality of stacked electromagnetic steel sheets and is fitted into the hermetic container 1 through shrink fitting, for example. The stator core 510 includes an annular back yoke 511 and nine teeth 512 (illustrated in FIG. 7) protruding radially inward from the inner periphery of the back yoke 511 and arranged at substantially equal intervals along a circumferential direction of the stator core. In the stator core 510, the annular back yoke 511 and the nine teeth 512 are made integral with each other.

The phrase "the annual back yoke 511 and the nine teeth 512 are made integral with each other" means that the annular back yoke 511 and the nine teeth 512 are in an integral and unseparated relationship.

The coil 520 is wound by a winding method called concentrated winding, by which a coil is wound around each of the teeth 512 without being wound across the plurality of teeth 512. The motor 3 is what is called a 6-pole 9-slot motor. The rotor 6 is rotated along with the shaft 12 by electromagnetic force generated on the stator 5 when electric current is passed through the coil 520.

The insulator 530 insulates the stator core 510 and the coil 520 from each other. The stator core 510 and the insulator 530 are insert-molded through resin molding. In the insulator 530 illustrated in FIG. 3, 531 denotes annular base parts, 532 denotes tube parts covering each of the teeth 512, 533 denotes annularly arranged wall parts disposed upright on axial end faces of the annular base parts 531, and 534 denotes ridge parts which each is an example of a thick-walled part disposed on a back yoke 511-side part of an inner surface of a respective one of slot portions 514 (see FIG. 8).

The inner surface of each slot portion 514, which constitutes a space between teeth 512 adjacent to each other along the circumferential direction of the stator core 510, is covered with a part of the resin forming the insulator 530. In the present embodiment, the resin covering the inner surface of the slot portion 514 has a thickness of 0.5 mm to 0.8 mm. More preferably, the resin covering the inner surface of the slot portion 514 may have a thickness of 0.25 mm to 0.3 mm, thereby further increasing the effective winding area.

The above-mentioned slot portion 514 refers to a region between adjacent teeth 512 for winding the coil 520.

The ridge parts 534 in the insulator 530 each protrude inward from a portion of the insulator in a middle between adjacent tube parts 532, which portion of the insulator 530 covers a back yoke 511-side part of the inner surface of a respective slot portion 514. The ridge parts 534 in the insulator 530 are disposed, each extending in an axially continuous manner.

Figure 4:
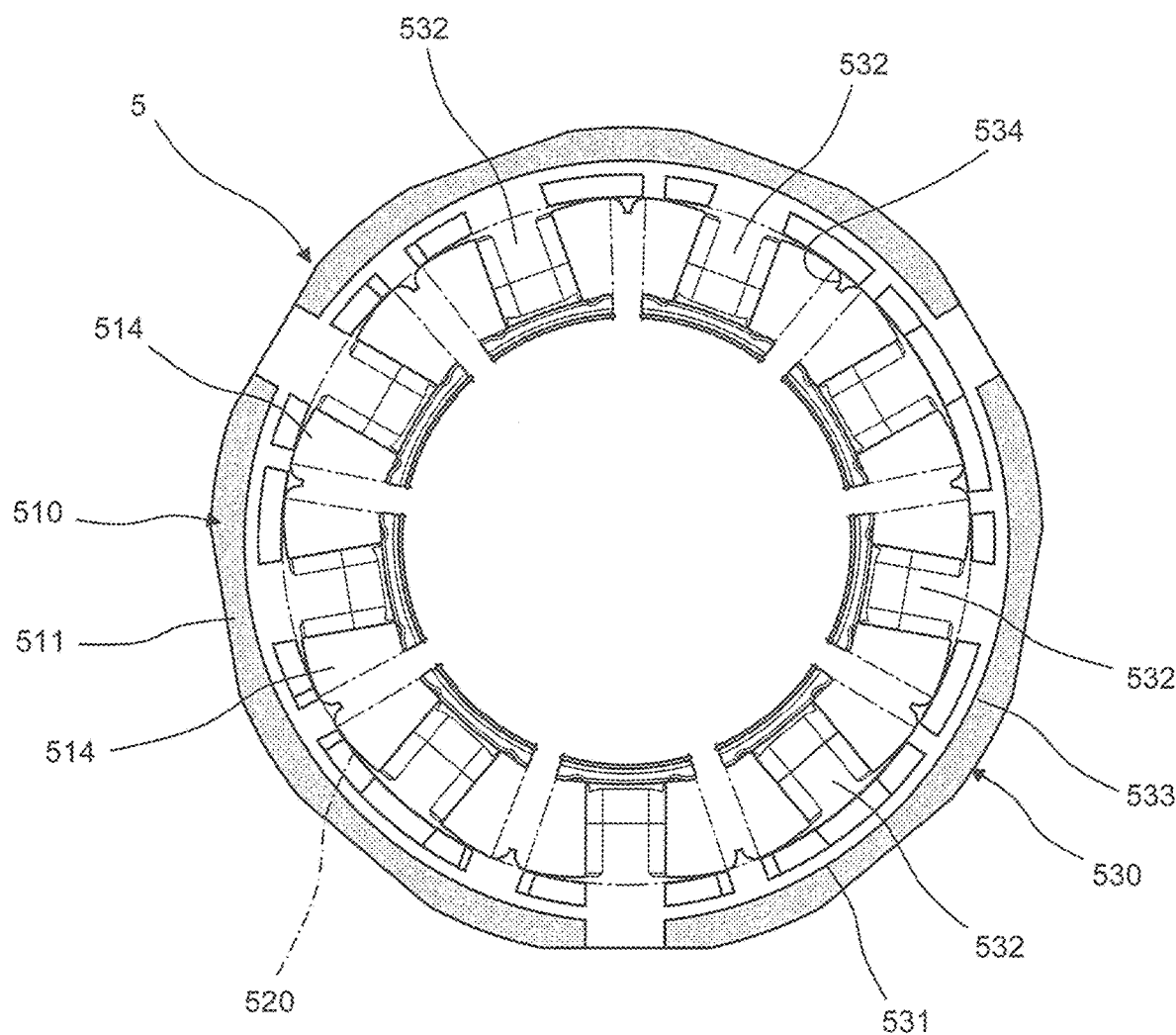
FIG. 4 is a top view of a stator of the motor.

FIG. 4 is a top view of the stator 5 of the motor 3. In FIG. 4, identical reference numbers are given to components identical to those in FIG. 3.

Figure 5:
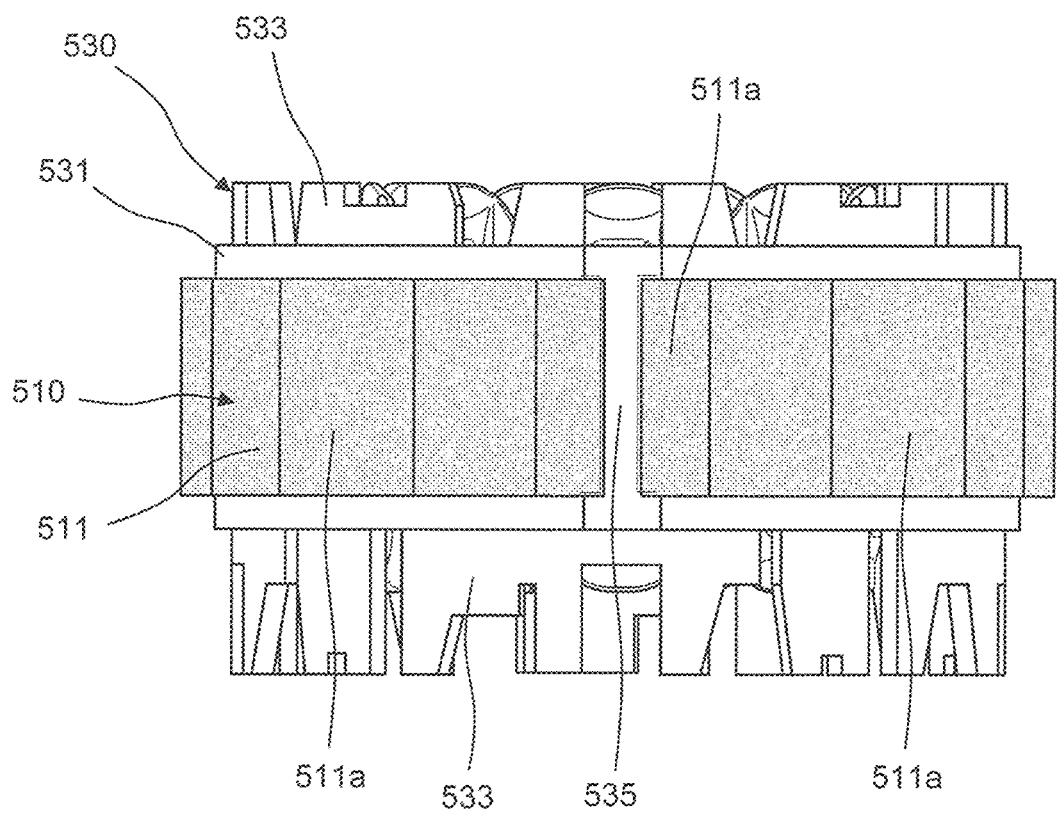
FIG. 5 is a side view of the stator.

FIG. 5 is a side view of the stator 5. In FIG. 5, identical reference numbers are given to components identical to those in FIG. 3, and 511a represents cut surfaces or panes made on the outer periphery of the stator core 510.

Figure 6:
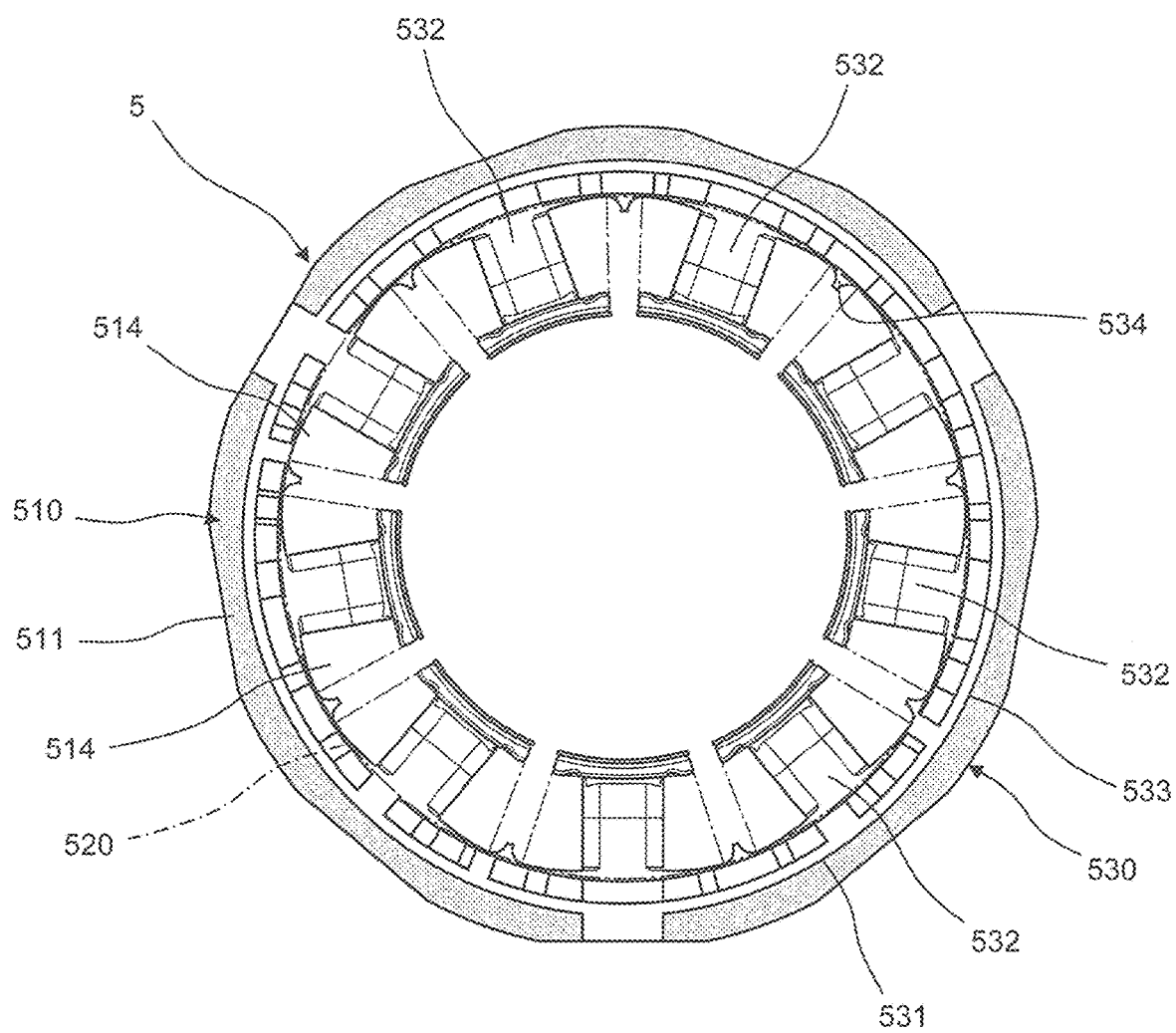
FIG. 6 is a bottom view of the stator.

FIG. 6 is a bottom view of the stator 5. In FIG. 6, identical reference numbers are given to components identical to those in FIG. 3.

Figure 7:
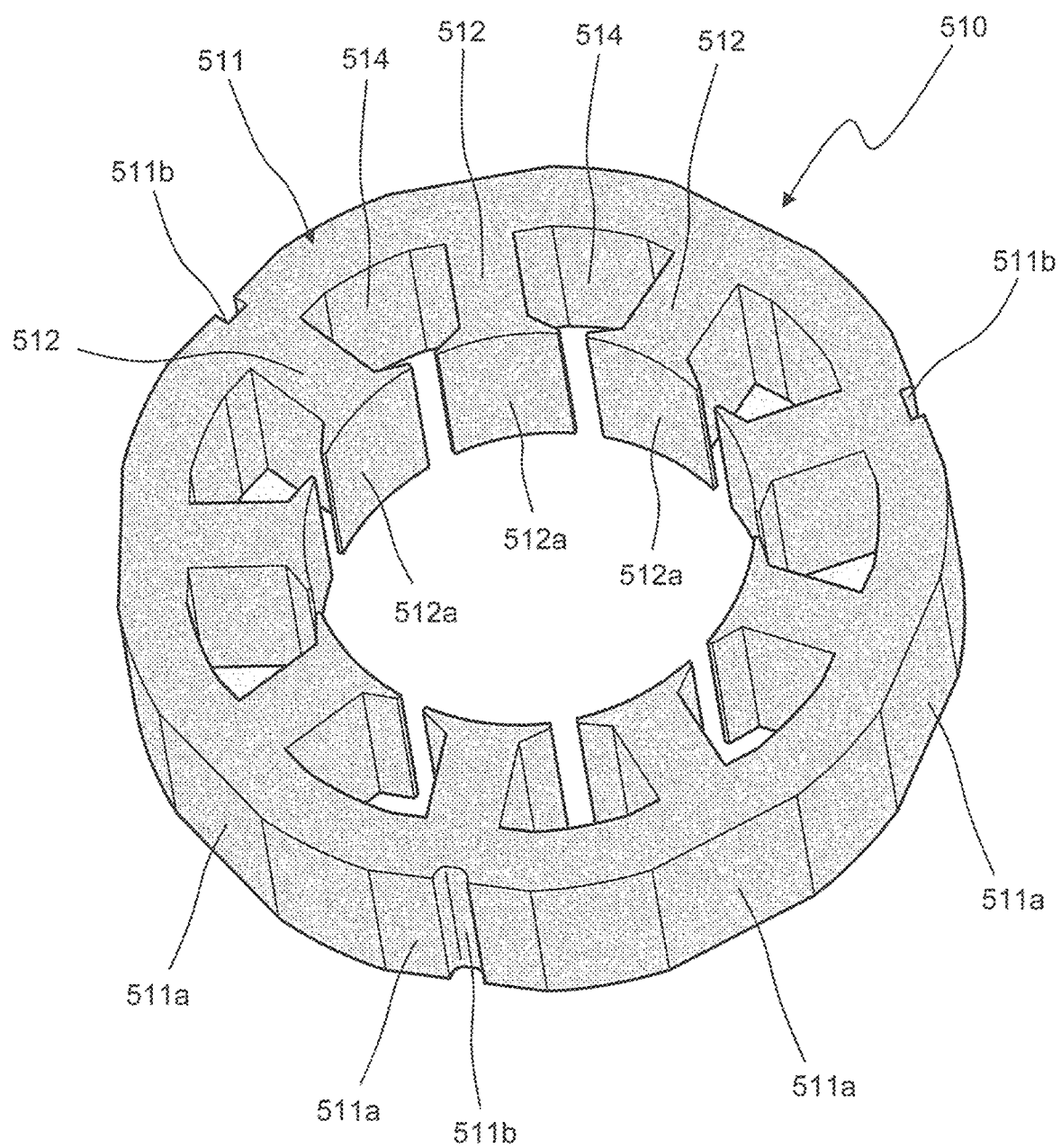
FIG. 7 is a perspective view of a stator core.

The following describes the stator core 510 referring to the perspective view in FIG. 7.

As illustrated in FIG. 7, the stator core 510 includes the annular back yoke 511 and a plurality of teeth 512 arranged at intervals on the inner periphery of the back yoke 511 along a circumferential direction.

The back yoke 511 of the stator core 510 includes the panes 511a and grooves 511b, where the panes 511a are disposed on the outer periphery opposite to the teeth 512 that are spaced apart by 40 degrees along the circumferential direction, and the grooves 511b are disposed along the axial direction on the panes 511a on the outer periphery opposite to three teeth 512 that are spaced apart by 120 degrees. A coupling portion 535 (illustrated in FIG. 5) of the insulator 530 is to be embedded in each of the grooves 511b.

Figure 8:
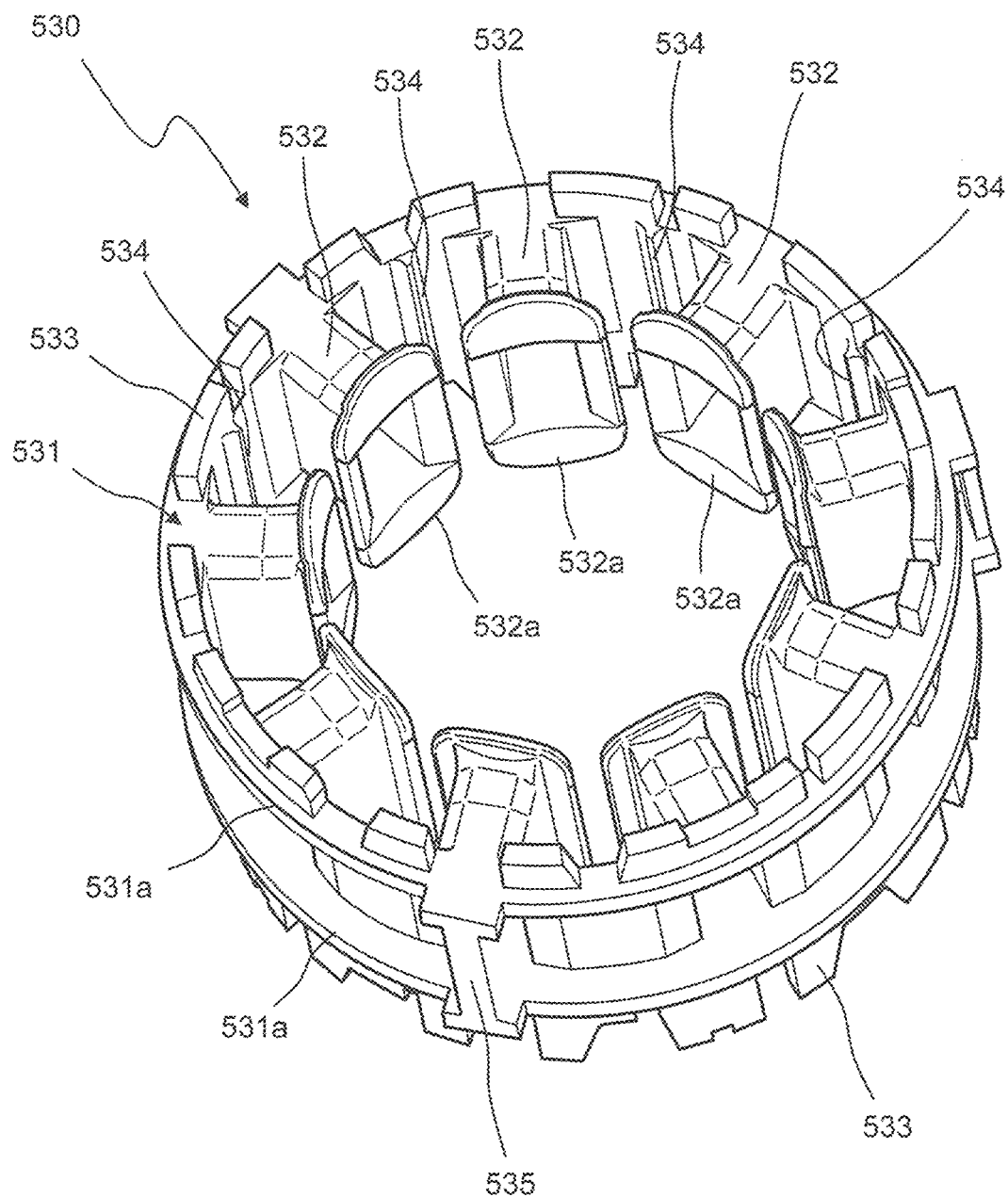
FIG. 8 is a perspective view of an insulator.

The following describes the insulator 530 referring to the perspective view in FIG. 8. In FIG. 8, identical reference numbers are given to components identical to those in FIG. 3.

As illustrated in FIG. 8, the insulator 530 includes: the annular base parts 531 that are disposed in such a way as to sandwich the back yoke 511 of the stator core 510 (illustrated in FIG. 7) from both axial sides: the nine tube parts 532 that protrude radially inward from the inner periphery of the annular base parts 531 and are arranged at substantially equal intervals along a circumferential direction: the wall parts 533 that are annually arranged and disposed upright on opposite axial end faces of the annular base parts 531: the ridge parts 534 that are disposed at portions of the insulator that cover the back yoke 511-side parts of the inner surfaces of the slot portions, the ridge parts 534 protruding inward in the middle between adjacent tube parts 532 (corresponding to the slot portions 514); and the coupling portions 535 that are disposed on the outer periphery along the axial direction to couple opposed annular end parts 531a of the annular base parts 531. A flange 532a for preventing detachment of the coil 520 is disposed at the tip of each tube part 532.

The ridge parts 534 in the insulator 530 are disposed in the respective slot portions 514, extending in an axially continuous manner. The ridge part 534 is in the shape of a mountain protruding radially inward in cross section taken along a plane orthogonal to the axial direction of the ridge part 534.

In the first embodiment, the ridge part 534 is in the shape of a mountain in cross section. However, the cross sectional shape is not limited thereto and the ridge part 534 may have any cross sectional shape as long as it is ensured that a flow path for a resin is provided when the molding is carried out through resin molding.

Figure 9:
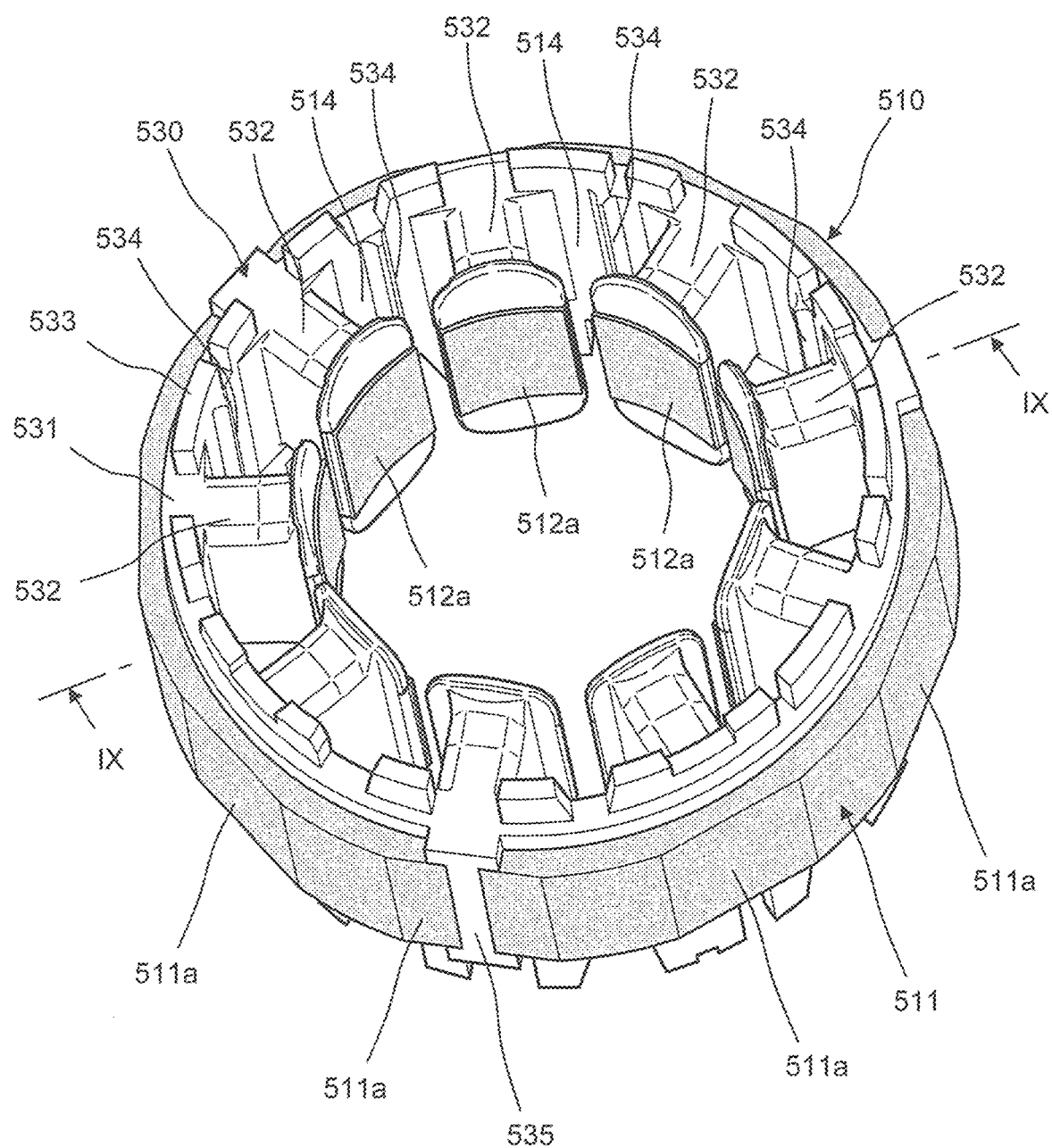
FIG. 9 is a perspective view of the insulator molded integrally with the stator core.

FIG. 9 is a perspective view of the insulator 530 molded integrally with the stator core 510. In FIG. 9, identical reference numbers are given to components identical to those in FIGS. 7 and 8.

Figure 10:
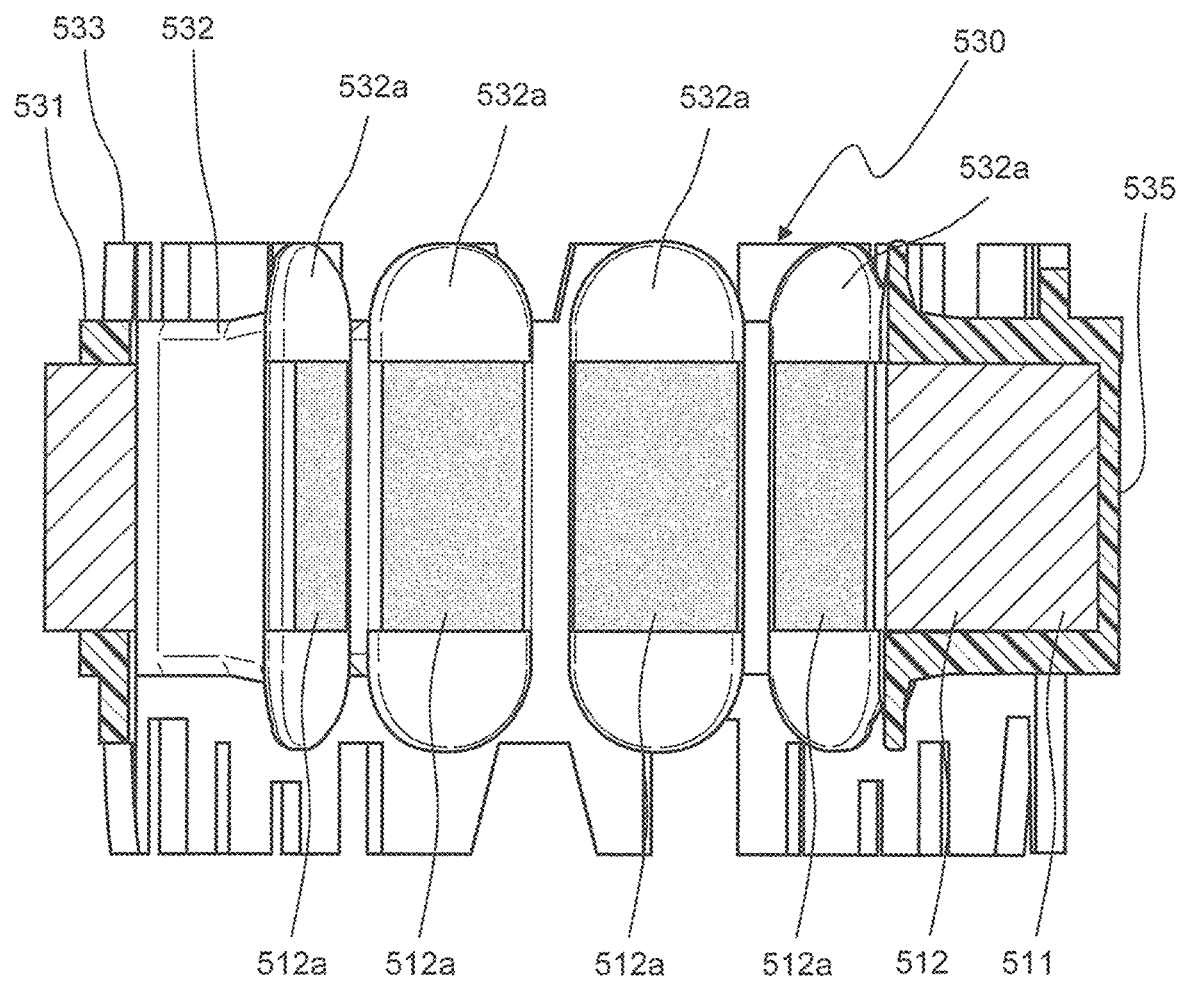
FIG. 10 is a cross-sectional view taken along the line IX-IX in FIG. 9.

FIG. 10 is a cross-sectional view taken along the line IX-IX in FIG. 9.

For the insulator 530 of the stator 5 according to the first embodiment described above, the stator core 510 constituted of a plurality of stacked electromagnetic steel sheets is fitted into a mold (not illustrated) at first. Then, the insulator 530 is integrated with the stator core 510 through insert molding by which a resin is injected around the stator core 510 inserted in the mold. At this time, the insulator 530 is molded integrally with the stator core 510 while the stator core 510 is held between pressing pins (not illustrated) pressing along the thickness direction of the stator core. This allows the plurality of electromagnetic steel sheets to be tightly stacked without need for creating any swaging portions on the electromagnetic steel sheets, thus improving a stack ratio of the stator core 510.

In addition, the stator core 510 having a higher stack ratio with a smaller gap between stacked steel sheets is held by the insulator 530 which covers the stator core 510 in whole, and thus rigidity of the stator core 510 is enhanced. As a result, need for operations for enhancing the rigidity of the stator core, such as filling a gap between stacked steel sheets with varnish, is eliminated.

By configuring the stator as above, the insulator 530 is molded integrally with the stator core 510 through resin molding, and the insulator 530 covers the inner surfaces of the slot portions 514 of the stator core 510. Hence, each of the teeth 512 and the coil 520 wound therearound can be insulated from each other by the resin. This eliminates need for slot cells, which in turn eliminates need for a step of placing the slot cells into the slot portions 514 between teeth 512, and thus the assembly process can be simplified.

The phrase "molding the insulator 530 integrally with the stator core 510 through resin molding" refers to molding the insulator 530 and the stator core 510 in such a way that these two elements are integrated with each other.

Further, the stator core 510 constituted of a plurality of stacked electromagnetic steel sheets with no swaging portion is held by the insulator 530 covering the stator core 510 in whole. This improves rigidity of the stator core 510 and hence reduces noise and vibration produced during motor driving, as well as improving the stack ratio and eliminating a loss due to presence of swaging portions (loss caused by induced current flowing at an insulation short-circuited point). As a result, the motor performance can be significantly improved.

The insulator 530 has the ridge parts 534 as the thick-walled portions in positions in middle between the adjacent teeth 512 of the stator core 510, in which positions the insulator 530 covers the back yoke 511-side parts of the inner surfaces of the slot portions 514 of the stator core 510. Hence, it is ensured that the ridge parts 534, which are disposed on the side of the back yoke 511, provide a flow path for a resin when the insulator 530 is molded integrally with the stator core 510 through resin molding, thus thin-walled portions can be made thinner while the resin covering the inner surfaces of the slot portions 514 is prevented from molding failure. Since each ridge part 534 is disposed in the middle between adjacent teeth 512 of the stator core 510, the coil 520 to be wound around each of the teeth 512 in a process after the molding does not interfere with the ridge part 534.

Except for the ridge part 534, the resin covering the inner surface of the slot portion 514 is made thin, and thus the coil 520 can be insulated from the teeth 512 without reducing the effective winding area.

The ridge parts 534 in the insulator 530 are disposed at the respective slot portions 514 of the stator core 510, extending in an axially continuous manner. Thus, it is ensured that the ridge parts 534 provide flow paths for a resin all the way along the axial direction when the insulator 530 is molded integrally with the stator core 510 through resin molding, thereby the resin covering the inner surfaces of the slot portions 514 can be certainly prevented from molding failure.

In the present embodiment, the ridge parts 534 in the insulator 530 each are disposed from one axial end to the other axial end of the inner surface of the respective slot portion 514 in such a way that the ridge parts 534 are continuous all the way along the axial direction. However, the ridge part may be partially disposed on at least one of the one axial end side and the other axial end side of the inner surface of the slot portion.

Further, the ridge parts 534 are disposed in the insulator 530 and therefore, during insert molding, a resin can be easily injected into the slot portions 514 from a gate created at either axial side or both axial sides of the ridge parts 534, thus eliminating need for placing a gate in the slot portions 514 for injecting a resin. As a result, the mold can be simpler in structure, and no scar of a gate is formed on a thin-walled portion of the insulator 530 in the slot portion 514.

Further, the coupling portions 535 are disposed along the axial direction of the outer periphery of the stator core 510 to couple the annular end parts 531a that sandwich the stator core 510 from both axial sides, which can improve strength of the outer peripheries of the stator core 510 and of the insulator 530 after integral molding. In addition, the coupling portions 535 of the insulator 530 serve as paths for a resin flowing along the axial direction during insert molding, thus contributing to uniform loading of the resin into the mold.

In the first embodiment described above, the motor 3 included in the compressor is an inner rotor type motor. However, the present invention may be applied to outer rotor type motors and to compressors equipped with such a motor. The motor of the present invention may be applied not only to compressors but also to any other apparatus that employs a motor.

In the first embodiment described above, the compressor is a vertical rotary-type compressor. However, the present invention is not limited thereto and may be applied to horizontal compressors and may also be applied to, for example, scroll-type compressors.

Second Embodiment

Figure 11:
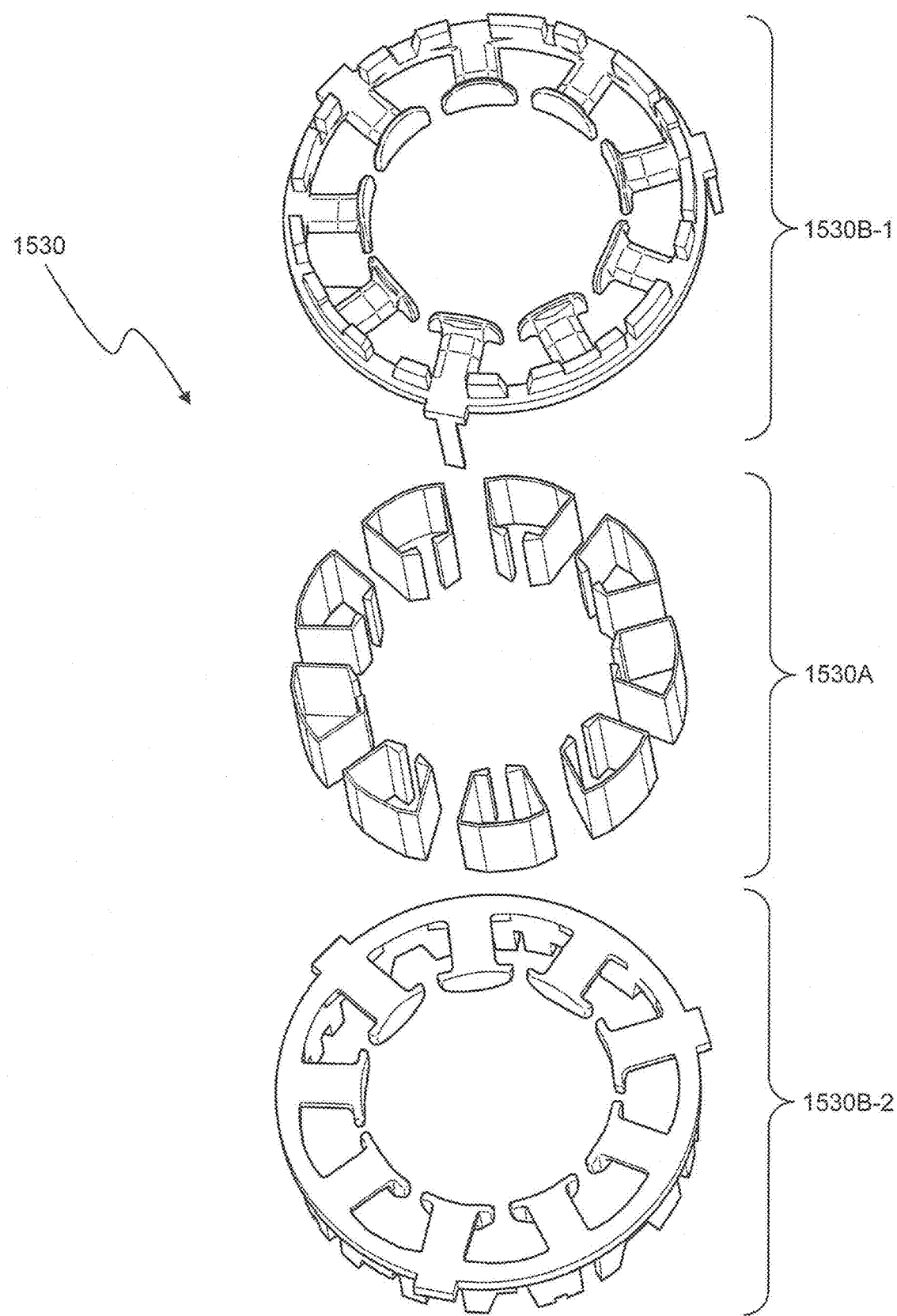
FIG. 11 is an exploded perspective view of an insulator of a stator according to a second embodiment of the present invention.

FIG. 11 is an exploded perspective view of an insulator 1530 of a stator according to a second embodiment of the present invention. Except for the insulator 1530, the stator of the second embodiment is identical in configuration to the stator 5 of the first embodiment, and FIGS. 3 to 10 are also used for the second embodiment.

As illustrated in FIG. 11, the insulator 1530 includes a first resin molded part 1530A and second resin molded parts 1530B-1 and 1530B-2, where the first resin molded part 1530A is molded in such a way as to cover the inner surfaces of slot portions 514 of a stator core 510 (illustrated in FIG. 7), and the second resin molded parts 1530B-1 and 1530B-2 are molded in such a way as to be continuous with the first resin molded part 1530A and to cover both axial sides of the stator core 510.

Although FIG. 11 illustrates the first resin molded part 1530A and the second resin molded parts 1530B-1 and 1530B-2 separately, these parts are actually integrally molded and form the insulator 1530.

For the insulator 1530, the stator core 510 constituted of a plurality of stacked electromagnetic steel sheets is fitted into a mold at first. Then, a resin is injected into the slot portions 514 of the stator core 510 inserted in the mold, thereby molding the first resin molded part 1530A having a thickness as small as about 0.5 mm to 0.8 mm.

Next, when the first resin molded part 1530A gets cool and cured, a resin is injected for molding the second resin molded parts 1530B-1 and 1530B-2 providing the thick-walled portions such that the second resin molded parts 1530B-1 and 1530B-2 are continuous with the first resin molded part 1530A, thereby integrating the insulator 1530 with the stator core 510. Note that a resin may be injected for forming the second resin molded parts 1530B-1 and 1530B-2 in parallel with injecting a resin for forming the first resin molded part 1530A.

No parting plane of the mold used here should be present on the inner surfaces of the slot portions 514.

In the second embodiment, the same resin material is used for the first resin molded part 1530A and the second resin molded parts 1530B-1 and 1530B-2. However, different resin materials may be used.

Note that the ridge parts according to the first embodiment are not disposed in the insulator 1530 of the second embodiment.

The stator of the second embodiment has advantageous effects similar to those provided by the stator of the first embodiment.

Further, production of the insulator 1530 employs two-stage molding in which the first resin molded part 1530A is insert-molded in such a way as to cover the inner surfaces of the slot portions 514 of the stator core 510, and then the second resin molded parts 1530B-1 and 1530B-2 are insert-molded in such a way as to be continuous with the first resin molded part 1530A and to cover both axial sides of the stator core 510, thereby the insulator 1530 is molded integrally with the stator core 510. Therefore, the first resin molded part 1530A that covers the inner surfaces of the slot portions 514 can be easily made thin-walled by molding the first resin molded part 1530A with a suitable mold and suitable resin material, apart from the molding process carried out for the second resin molded parts 1530B-1 and 1530B-2 that cover both axial sides of the stator core 510.

Third Embodiment

Except for fluidity of the first resin molded part 1530A and the second resin molded parts 1530B-1 and 1530B-2, an insulator 1530 used for a stator according to a third embodiment of the present invention is identical in configuration to the insulator 1530 of the stator according to the second embodiment.

In the insulator 1530 of the stator 5 according to the third embodiment, the resin for the first resin molded part 1530A has higher fluidity than the resin for the second resin molded parts 1530B-1 and 1530B-2. For example, the resin used for the first resin molded part 1530A is LCP which has high fluidity but is expensive, while the resin used for the second resin molded parts 1530B-1 and 1530B-2 is PBT, which has lower fluidity but is less expensive.

The fluidity of resin mentioned herein refers to fluidity of resin being heated and molten during molding.

Because a resin has higher fluidity as a melting temperature is higher, the same material may be used for the first resin molded part 1530A and the second resin molded parts 1530B-1 and 1530B-2, and the first resin molded part 1530A may be molded at a higher melting temperature so as to have higher fluidity than the second resin molded parts 1530B-1 and 1530B-2.

Note that the ridge parts according to the first embodiment are not disposed in the insulator 1530 of the third embodiment.

The stator of the third embodiment has advantageous effects similar to those provided by the stator of the second embodiment.

For the above-described insulator 1530, the resin for the first resin molded part 1530A of the insulator 1530 has higher fluidity than the resin for the second resin molded parts 1530B-1 and 1530B-2. Thus, during molding of the first resin molded part 1530A, which is carried out separately from molding of the second resin molded parts 1530B-1 and 1530B-2, the inner surfaces of the slot portions are covered with the resin having higher fluidity, thereby easily achieving a thin-walled portion while ensuring that molding failure is prevented.

No ridge part is disposed in the insulator 1530 of the foregoing second and third embodiments. However, ridge parts may be disposed in parts of the insulator covering the back yoke side of the inner surfaces of the slot portions of the stator core, and in the middle between adjacent teeth of the stator core.

Fourth Embodiment

Figure 12:
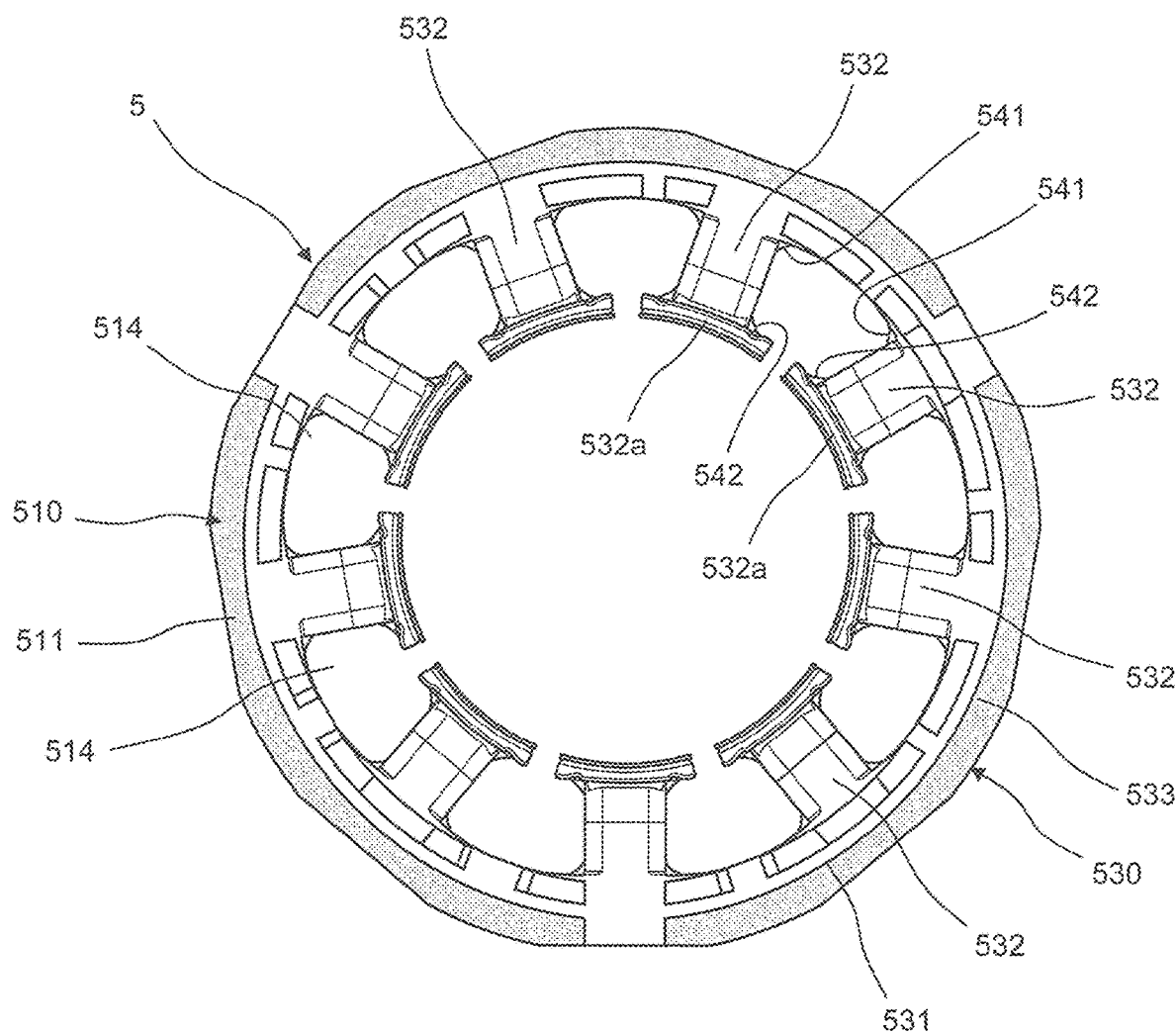
FIG. 12 is a top view of a stator according to a fourth embodiment of the present invention.

FIG. 12 is a top view of a stator 5 according to a fourth embodiment of the present invention. Except that thick-walled portions 541 and 542 are disposed in the insulator 530 instead of the ridge parts 534, the stator 5 of the fourth embodiment is identical in configuration to the stator 5 of the first embodiment, and FIGS. 3 to 10 are also used for the fourth embodiment. Note that the coil 520 is omitted in FIG. 12.

As illustrated in FIG. 12, the stator 5 of the fourth embodiment includes a stator core 510 and an insulator 530 that are insert-molded through resin molding. The insulator 530 insulates the stator core 510 and the coil 520 from each other.

In the insulator 530 illustrated in FIG. 12, 531 denotes annular base parts, 532 denotes tube parts covering each of the teeth 512, 533 denotes annularly arranged wall parts disposed upright on axial end faces of the annular base parts 531, 541 denotes thick-walled portions disposed in back yoke 511-side corners (at the base of each of the teeth 512) of the inner surfaces of slot portions 514, and 542 denotes thick-walled portions disposed in flange 532a-side corners of the inner surfaces of the slot portions 514, the flanges 532a being for preventing detachment of the coil from the associated teeth 512. The thick-walled portions 541 and 542 in the insulator 530 each extend in an axially continuous manner.

The inner surfaces of the slot portions 514, which constitute spaces between teeth 512 adjacent to each other along the circumferential direction of the stator core 510, are covered with a part of the resin forming the insulator 530. In the present embodiment, the resin at the thin-walled portions (being thinner than the thick-walled portions 541 and 542) that covers the inner surfaces of the slot portions 514 has a thickness of 0.5 mm to 0.8 mm. More preferably, the resin covering the inner surfaces of the slot portions 514 may have a thickness of 0.25 mm to 0.3 mm, which can further increase the effective winding area.

The stator 5 of the fourth embodiment has advantageous effects similar to those provided by the stator of the first embodiment.

In the above-described fourth embodiment, both of the thick-walled portions 541 and the thick-walled portions 542 are disposed on the inner surface of the slot portion 514 in the insulator 530. However, either the thick-walled portions 541 or the thick-walled portions 542 may be disposed.

Figure 13:
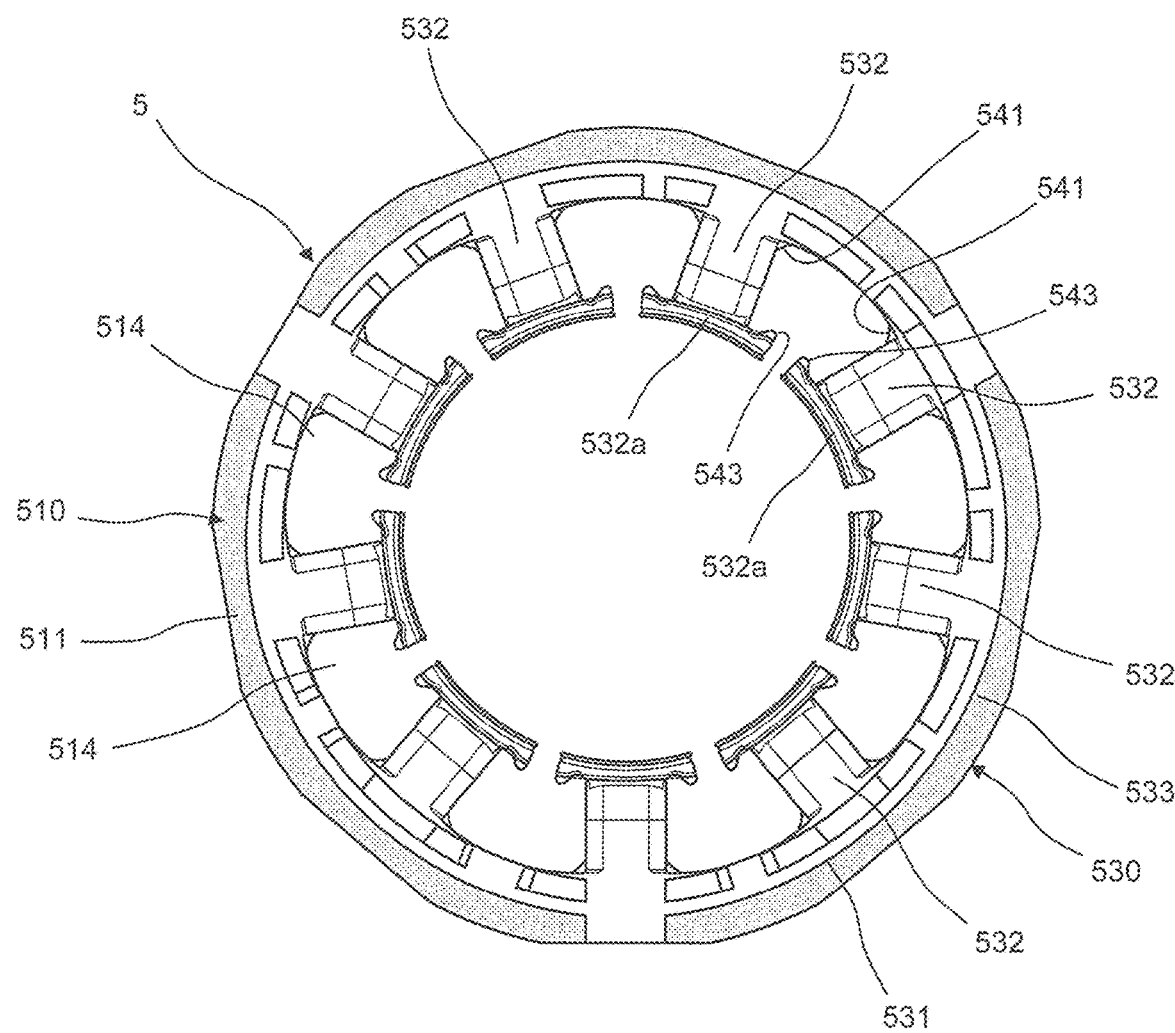
FIG. 13 is a top view of a modification of the stator according to a variation.

FIG. 13 is a top view of a variation of the stator. According to the variation in FIG. 13, the stator is identical in configuration to the stator 5 illustrated in FIG. 13 except that thick-walled portions 743 are disposed instead of the thick-walled portions 542 in the insulator 530.

In the insulator 530 illustrated in FIG. 13, 531 denotes annular base parts. 532 denotes tube parts covering each of the teeth 512, 533 denotes annularly arranged wall parts disposed upright on axial end faces of the annular base parts 531, 541 denotes thick-walled portions disposed in back yoke 511-side corners (at the base of each of the teeth 512) of the inner surfaces of slot portions 514, and 543 denotes thick-walled portions disposed along the facing edges of adjacent flanges 532a for preventing detachment of the teeth 512). The thick-walled portions 541 and 543 in the insulator 530 each extend in an axially continuous manner.

In the variation described above, both of the thick-walled portions 541 and 543 are disposed on the inner surfaces of the slot portions 514 in the insulator 530. However, either the thick-walled portions 541 or the thick-walled portions 543 may be disposed.

Alternatively, the thick-walled portions 541 and 542 of the fourth embodiment illustrated in FIG. 12 may be combined with the thick-walled portions 543 of the variation illustrated in FIG. 13.

Specific embodiments of the present invention have been described above, but the present invention is not limited to the foregoing first to fourth embodiments and various modifications may be made without departing from the scope of the present invention. For example, an embodiment of the present invention may be made by combining features described in the foregoing first to fourth embodiments as appropriate.

What is claimed is:

1. A stator comprising:
   a stator core in which an annular back yoke is integrated with a plurality of teeth circumferentially arranged on the hack yoke at intervals; and
   an insulator that sandwiches the stator core from axial sides of the stator core,
   the insulator being molded integrally with the stator core using resin molding such that the insulator covers an inner surface of a slot portion of the stator core,
   the insulator including annular end parts and a coupling portion, the annular end parts sandwiching the stator core from both axial sides, and the coupling portion being disposed axially extending along an outer periphery of the stator core to couple the annular end parts with each other.

2. The stator according to claim 1, wherein the insulator includes a thick-walled portion and a thin-walled portion in a portion where the insulator covers the inner surface of the slot portion of the stator core.

3. The stator according to claim 2, wherein the thick-walled portion in the insulator is disposed in a corner of the slot portion of the stator core.

4. The stator according to claim 2, wherein the thick-walled portion of the insulator is a ridge part disposed in a portion of the insulator
that covers a back yoke side part of the inner surface of the slot portion of the stator core, and
that is located in a middle between adjacent teeth of the stator core.

5. The stator according to claim 2, wherein the thick-walled portion of the insulator is disposed on the slot portion of the stator core in an axially continuous manner.

6. The stator according to claim 1, wherein the insulator includes
a first resin molded part covering the inner surface of the slot portion of the stator core and
a second resin molded part continuous with the first resin molded part and covering axial sides of the stator core.

7. The stator according to claim 6, wherein a resin of the first resin molded part of the insulator has higher fluidity than a resin of the second resin molded part.

8. A motor including the stator according to claim 1, the motor further comprising:
a rotor,
the stator being disposed radially facing the rotor.

9. A compressor including the motor according to claim 8, the compressor further comprising:
a hermetic container; and
a compression mechanism disposed in the hermetic container,
the motor being disposed in the hermetic container to drive the compression mechanism.

10. A stator comprising:
a stator core in which an annular back yoke is integrated with a plurality of teeth circumferentially arranged on the back yoke at intervals; and
an insulator that sandwiches the stator core from axial sides of the stator core,
the insulator being molded integrally with the stator core using resin molding such that the insulator covers an inner surface of a slot portion of the stator core,
the insulator including a thick-walled portion and a thin-walled portion in a portion where the insulator covers the inner surface of the slot portion of the stator core,
the thick-walled portion of the insulator being a ridge part disposed in a portion of the insulator
that covers a back yoke side part of the inner surface of the slot portion of the stator core, and
that is located in a middle between adjacent teeth of the stator core.

11. The stator according to claim 10, wherein the ridge part extends axially relative to the slot portion.

12. A motor including the stator according to claim 10, the motor further comprising:
a rotor,
the stator being disposed radially facing the rotor.

13. A compressor including the motor according to claim 12, the compressor further comprising:
a hermetic container; and
a compression mechanism disposed in the hermetic container,
the motor being disposed in the hermetic container to drive the compression mechanism.

* * * * *